US008631233B1

(12) United States Patent
Loc et al.

(10) Patent No.: US 8,631,233 B1
(45) Date of Patent: *Jan. 14, 2014

(54) PIPELINED PACKET ENCRYPTION AND DECRYPTION USING COUNTER MODE WITH CIPHER-BLOCK CHAINING MESSAGE AUTHENTICATION CODE PROTOCOL

(75) Inventors: Peter Loc, Cupertino, CA (US); Rahul Kopikare, Livermore, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/555,825

(22) Filed: Jul. 23, 2012

Related U.S. Application Data (62) Division of application No. 12/217,928, filed on Jul. 10, 2008, now Pat. No. 8,229,110, which is a division of application No. 10/974,458, filed on Oct. 27, 2004, now Pat. No. 7,742,594.

(51) Int. Cl.
*H04L 29/06* (2006.01)

(52) U.S. Cl.
USPC .......................................................... 713/160

(58) Field of Classification Search
USPC .......................................................... 713/160
See application file for complete search history.

(56) References Cited

U.S. PATENT DOCUMENTS

| | | |
|---|---|---|
| 5,999,629 A | 12/1999 | Heer et al. |
| 6,438,235 B2 | 8/2002 | Sims, III |
| 6,550,011 B1 | 4/2003 | Sims, III |
| 6,683,954 B1 | 1/2004 | Searle |
| 6,965,674 B2 | 11/2005 | Whelan et al. |
| 7,245,724 B1 | 7/2007 | Chesson et al. |
| 7,350,077 B2 | 3/2008 | Meier et al. |
| 7,380,135 B2 | 5/2008 | Nishimoto et al. |
| 7,697,688 B1 | 4/2010 | Loc et al. |
| 7,742,594 B1 | 6/2010 | Loc et al. |
| 8,208,632 B1 | 6/2012 | Loc et al. |
| 8,229,110 B1 | 7/2012 | Loc et al. |
| 2004/0034785 A1 | 2/2004 | Tai et al. |
| 2004/0083362 A1 | 4/2004 | Park et al. |
| 2004/0142710 A1 | 7/2004 | Liang |
| 2004/0202317 A1 | 10/2004 | Demjanenko et al. |
| 2005/0172119 A1 | 8/2005 | Eckhardt et al. |
| 2005/0278548 A1 | 12/2005 | Lin et al. |

OTHER PUBLICATIONS

IEEE P802.11i, IEEE Standard for Information technology—Telecommunications and information exchange between systems—Local and metropolitan area networks—Specific requirements; Part 11: Wireless Medium Access Control (MAC) and Physical Layer (PHY) specifications: Amendment 6: Medium Access Control (MAC) Security Enhancements, Apr. 2004, pp. 1-171.
U.S. Appl. No. 10/974,388, filed Oct. 27, 2004, Loc et al.

(Continued)

*Primary Examiner* — Jason Gee (57) ABSTRACT

An apparatus including a key mixing circuit, an input circuit, a packet number circuit, and an encryption circuit. The key mixing circuit generates a plurality of encryption seeds, wherein each encryption seed is generated based upon a predetermined key, a transmitter address, and a corresponding value for a packet number. The input circuit receives a plurality of packets of data. The packet number circuit inserts, into each packet of data received by the input circuit, a different one of the corresponding values for a packet number. The encryption circuit encrypts each packet of data using the encryption seed that was generated based on the corresponding value for the packet number inserted into the packet of data. The key mixing circuit generates each of the plurality of encryption seeds prior to the input circuit receiving the plurality of packets of data.

9 Claims, 5 Drawing Sheets

(56) References Cited

OTHER PUBLICATIONS

IEEE Standard 802.11 (1999 Edition; 542 pages); IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications.

IEEE Standard 802.11a (1999 Edition; Amdended 2000; 92 pages); Supplement to IEEE Standard for Information Technology; Telecommunications and Information Exchange Between Systems; Local and Metropolitan Area Networks; Specific Requirements; Part 11:.Wireless LAN Medium Access Control (MAC) and Physical Layer (PHY) Specifications; High-Speed Physical Layer in the 5 GHz Band.

IEEE Standard P802.11G, Draft Supplement to Standard for Information technology—Telecommunications and information exchange beween systems—Local and metropolitan area networks—Specific requirements, Part 11: Wireless LAN Medium Access Control (MAC) and Physical Layer (PHY) specifications: Further Higher Data Rate Extension in the 2.4 GHz Band, Apr. 2003, pp. 1-69.

IEEE Standard 802.11b (Sep. 16, 1999 Edition) 96 pages); Supplement to IEEE Standard for Information Technology; Telecommuncations and Information Exchange Between Systems; Local and Metropolitan Area Networks; Specific Requirements; Part 11: Wireless LAN Medium Access Control (MAC) and Physical Layer (PHY) Specifications; Higher-Speed Physical Layer Extension ni the 2.4 GHz Band.

IEEE Standard 802.11i (Apr. 2004) 177 pages); IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 6: Medium Access Control (MAC) Security Enhancements.

IEEE 802.20-PD-06 (Jul. 16, 2004) 24 pages); Draft 802.20 Permanent Document; System Requirements for IEEE 802.20 Mobile Broadband Wireless Access Systems—Version 14.

IEEE Std. 802.16; IEEE Standard for Local and metropolitan area networks; Part 16: Air Interface for Fixed Broadband Wireless Access Systems; Apr. 8, 2002; pp. 1-322.

IEEE Std. 802.16; IEEE Standard for Local and metropolitan area networks; Part 16: Air Interface for Fixed Broadband Wireless Access Systems; Oct. 1, 2004; pp. i-xxxiv and 1-857; IEEE Std 802.16-2004, IEEE, United States.

PIPELINED PACKET ENCRYPTION AND DECRYPTION USING COUNTER MODE WITH CIPHER-BLOCK CHAINING MESSAGE AUTHENTICATION CODE PROTOCOL

CROSS-REFERENCE TO RELATED APPLICATIONS

This application is a divisional of U.S. patent application Ser. No. 12/217,928, filed Jul. 10, 2008, which is a divisional of U.S. patent application Ser. No. 10/974,458, filed Oct. 27, 2004, which is related to U.S. Pat. No. 7,697,688, issued Apr. 13, 2010, the disclosure thereof incorporated by reference herein in its entirety.

BACKGROUND

The present invention relates generally to encryption and decryption of data communications packets. More particularly, the present invention relates to pipelining such encryption and decryption to achieve faster data throughput.

Network devices operating in a wireless local-area network (WLAN) must employ the Counter Mode With Cipher-Block Chaining Message Authentication Code Protocol (CCMP) to comply with the IEEE 802.11i standard to protect the confidentiality and integrity of transmitted data from malicious attacks.

According to CCMP, the sender encrypts packets of data to be sent using a temporal key negotiated with the receiver. The receiver, upon receiving the packets, decrypts the packets using the temporal key. This scheme works well as long as the transmitted packets are separated by inter-packet gaps that are large enough to allow the receiver to complete the decryption of one packet before the next packet arrives.

However, in WLAN applications that require very high throughput, data packets are transmitted in succession with no inter-packet gaps. In addition, in IEEE 802.11n Multiple Input Multiple Output (MIMO) systems, data packets are transmitted at even higher data rates, leaving even less time for decryption.

SUMMARY

In general, in one aspect, the present disclosure features an apparatus including a key mixing circuit, an input circuit, a packet number circuit, and an encryption circuit. The key mixing circuit is configured to generate a plurality of encryption seeds, wherein each encryption seed is generated based upon a predetermined key, a transmitter address, and a corresponding value for a packet number. The input circuit is configured to receive a plurality of packets of data. The packet number circuit is configured to insert, into each packet of data received by the input circuit, a different one of the corresponding values for a packet number. The encryption circuit is configured to encrypt each packet of data using the encryption seed that was generated based on the corresponding value for the packet number inserted into the packet of data. The key mixing circuit is further configured to generate each of the plurality of encryption seeds prior to the input circuit receiving the plurality of packets of data.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears.

DETAILED DESCRIPTION

Embodiments of the present invention employ pipelining strategies that allow encryption and decryption of packets in two stages, one of which is implemented for each packet before the packet is received. These pipelining approaches significantly reduce the time required to encrypt and decrypt a series of packets.

The two stages are encryption seed generation and encryption or decryption. When certain parameters for the packets to be received are known or assumed in advance, the encryption seeds for the packets can be generated before receiving the packets. Therefore the packets can be encrypted or decrypted immediately upon arrival, rather than after the time-consuming encryption seed generation process.

Embodiments of the present invention are described with respect to the Counter Mode With Cipher-Block Chaining Message Authentication Code Protocol (CCMP) specified by the IEEE 802.11i standard. However, as will be apparent to one skilled in the relevant arts after reading this description, the techniques disclosed herein are equally applicable to other sorts of encryption and encapsulation protocols, and to wired networks as well as wireless networks.

Figure 1:
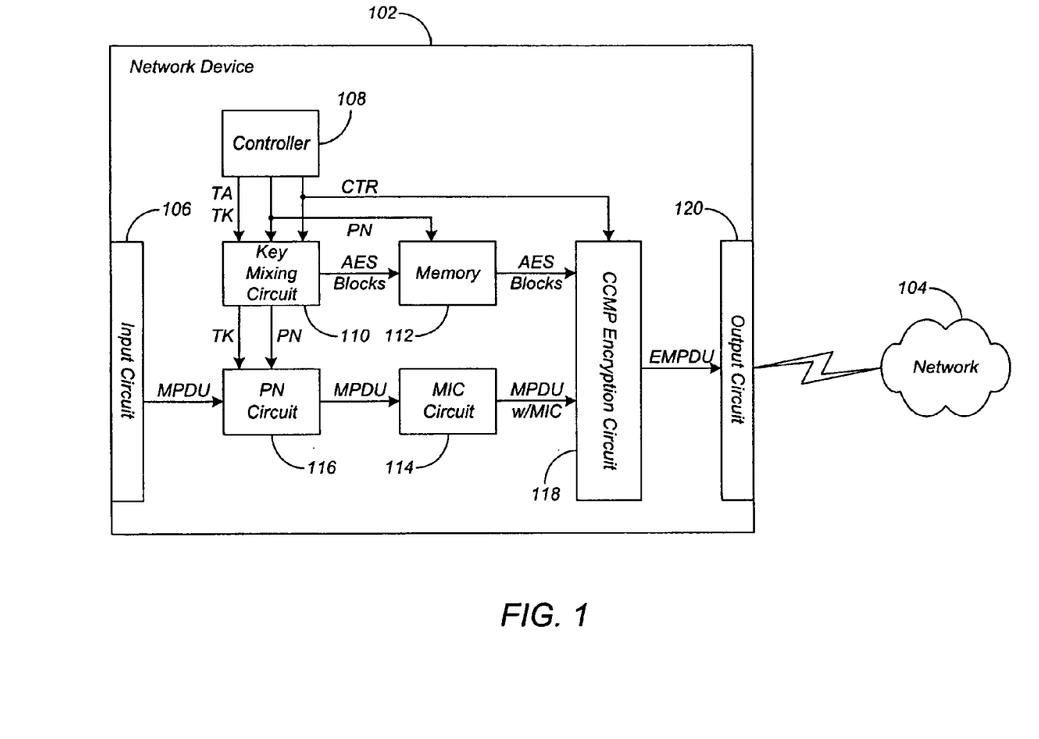
FIG. 1 shows a network device in communication with a network such as a wireless local-area network (WLAN) according to a preferred embodiment.

FIG. 1 shows a network device 102 in communication with a network 104 such as a wireless local-area network (WLAN) according to a preferred embodiment. Network device 102 comprises an input circuit 106, a controller 108, a key mixing circuit 110, a memory 112, a Message Integrity Code (MIC) circuit 114, a packet number (PN) circuit 116, a CCMP encryption circuit 118, and an output circuit 120. According to some embodiments, network device 102 is compliant with IEEE standards 802.11i, and is otherwise compliant with one or more of IEEE standards 802.11, 802.11a, 802.11b, 802.11g, 802.11n, 802.16, and 802.20, the disclosures thereof incorporated herein by reference in their entirety.

Figure 2:
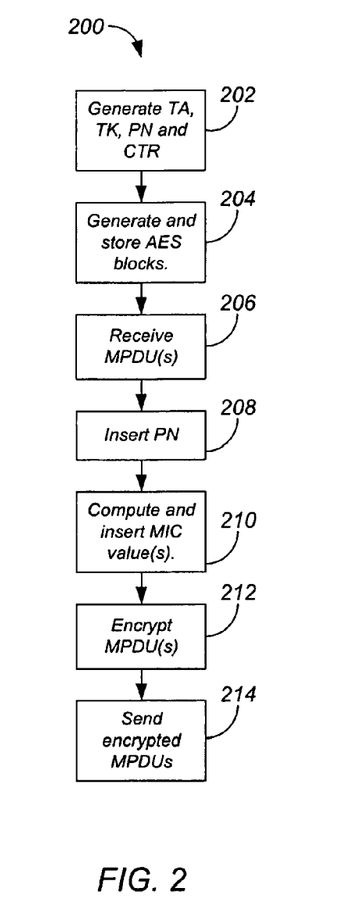
FIG. 2 shows a pipelined two-stage encryption and transmission process for network device of FIG. 1 according to a preferred embodiment.

FIG. 2 shows a pipelined two-stage encryption and transmission process 200 for network device 102 of FIG. 1 according to a preferred embodiment. In the second of the two stages, each of N Media Access Control (MAC) Payload Data Units (MPDUs) are encrypted using one of N groups of Advanced Encryption Standard (AES) Output Blocks (also referred to herein as "AES blocks"). The first stage of the process generates the N groups of AES blocks ahead of time so they are ready when the second stage begins.

Referring to FIG. 2, controller 108 provides a transmitter MAC address TA, a temporal key TK, and at least a start value for a packet number (PN) and counter (CTR) to key mixing circuit 110 (step 202). The transmitter MAC address TA is a MAC address for network device 102. The temporal key TK is a key that is negotiated in advance by network device 102 and an intended receiver, as is well-known in the relevant arts. The PN is a counter for the MPDUs to ensure sequential reception at the intended receiver, as described in detail below. The CTR is a counter to count the number of 16-octet blocks in the payload of each MPDU.

Key mixing circuit 110 generates each of the N groups of AES blocks based upon temporal key TK, transmitter MAC address TA, and the start value for PN, and stores the N groups of AES blocks in memory 112 (step 204). Preferably key mixing circuit 110 generates a group of AES blocks for each of N sequential values of PN beginning with the start value provided by controller 108, although other methods could be used. The start value for PN is preferably initialized to one (PN=1) during initialization of network device 102, and is incremented for each group of AES blocks generated.

Each group of AES blocks comprises multiple AES block ciphers, each having a length of 16 octets. Preferably key mixing circuit 110 generates a AES block for each of M sequential values of CTR beginning with the start value provided by controller 108, although other methods could be used. The start value for CTR is preferably initialized to one (CTR=1) for each MPDU, and is incremented for each AES block cipher generated. A full description of this operation is given in IEEE standard 802.11i.

Input circuit 106 subsequently receives one or more MPDUs (step 206), for example from a host unit or processor within network device 102. PN circuit 116 inserts a value for PN into each MPDU so the MPDUs are numbered sequentially (step 208). Each of the N values for the PN is greater than, or equal to, the start value for the PN.

MIC circuit 114 computes a MIC value for each MPDU based upon a MIC key, and inserts the MIC value into the respective MPDU (step 210) according to methods well-known in the relevant arts.

CCMP encryption circuit 118 encrypts each of the N MPDUs using the one of the N groups of AES blocks that was generated based on the value for the PN in the respective one of the N MPDUs (step 212). For example, CCMP encryption circuit 118 receives a MPDU from PN circuit 116 and the corresponding group of AES blocks from memory 112, and performs the encryption according to methods well-known in the relevant arts to produce an encrypted MPDU (EMPDU).

Output circuit 120 sends the N EMPDUs (step 214). For example, output circuit 120 can comprise a wireless physical-layer device (PHY) and antenna. As another example, output circuit 120 can be a MAC output circuit that provides the EMPDUs to a separate PHY and antenna for transmission to network 104.

According to process 200, key mixing circuit 110 generates each of the N groups of AES blocks before input circuit 106 receives the respective MPDUs. Therefore each group of AES blocks is available when the corresponding MPDU arrives at CCMP encryption circuit 118. This pipelining process ensures that no time is wasted in waiting for a group of AES blocks to be generated after receiving the corresponding MPDU.

Figure 3:
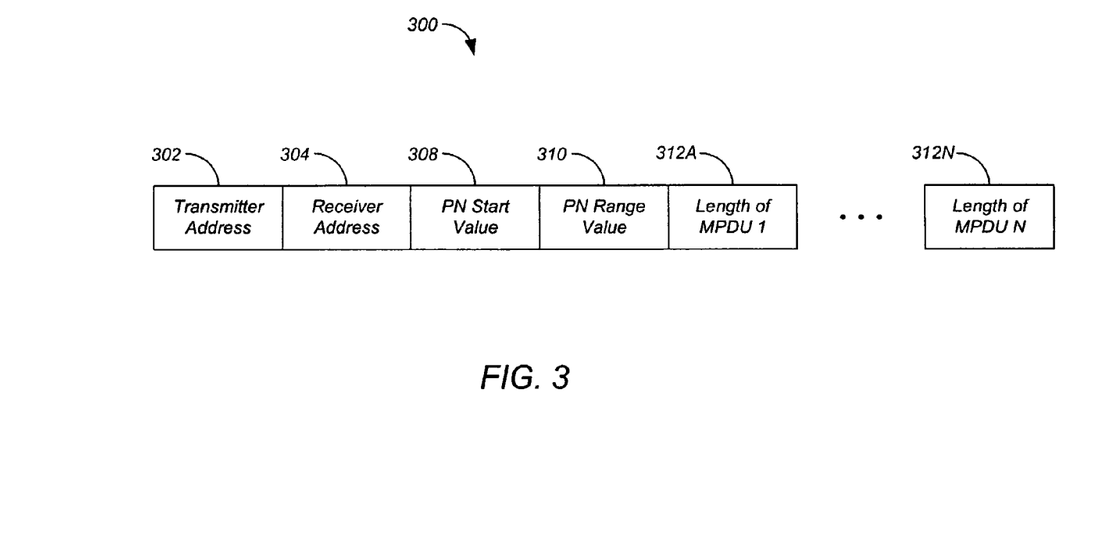
FIG. 3 shows the format of a pipelining setup message according to a preferred embodiment.

In some embodiments, network device 102 generates and sends a pipelining setup message containing information describing the N MPDUs before sending the MPDUs. The pipelining setup message can be used by the intended recipient to pipeline the decryption process, as described in detail below. Network device 102 can generate and send the pipelining setup message either with or without performing the pipelining process 200 described above. FIG. 3 shows the format of a pipelining setup message 300 according to a preferred embodiment.

Pipelining setup message 300 preferably comprises a transmitter address 302, a receiver address 304, a PN start value 308, an optional PN range value 310, and the lengths 312A-312N of each of the N MPDUs represented by pipelining setup message 300. Transmitter address 302 is preferably the 6-byte MAC address of network device 102. Receiver address 304 is preferably the 6-byte MAC address of a wireless receiver, such as a wireless access point, in network 104.

PN start value 308 is the 6-byte value of PN for the first of the N MPDUs to be sent. PN range value 310 is a 1-byte value representing the number N of MPDUs to be sent. Of course, the PN information can be represented in other ways in pipelining setup message 300. For example, instead of including the start value and range for PN, the PN information could comprise the end value and range, the start and end values, or any other parameters that can be used to calculate the start and range values of PN. Each length value 312 is a 1-byte value representing the length in bytes of the respective MPDU.

Figure 4:
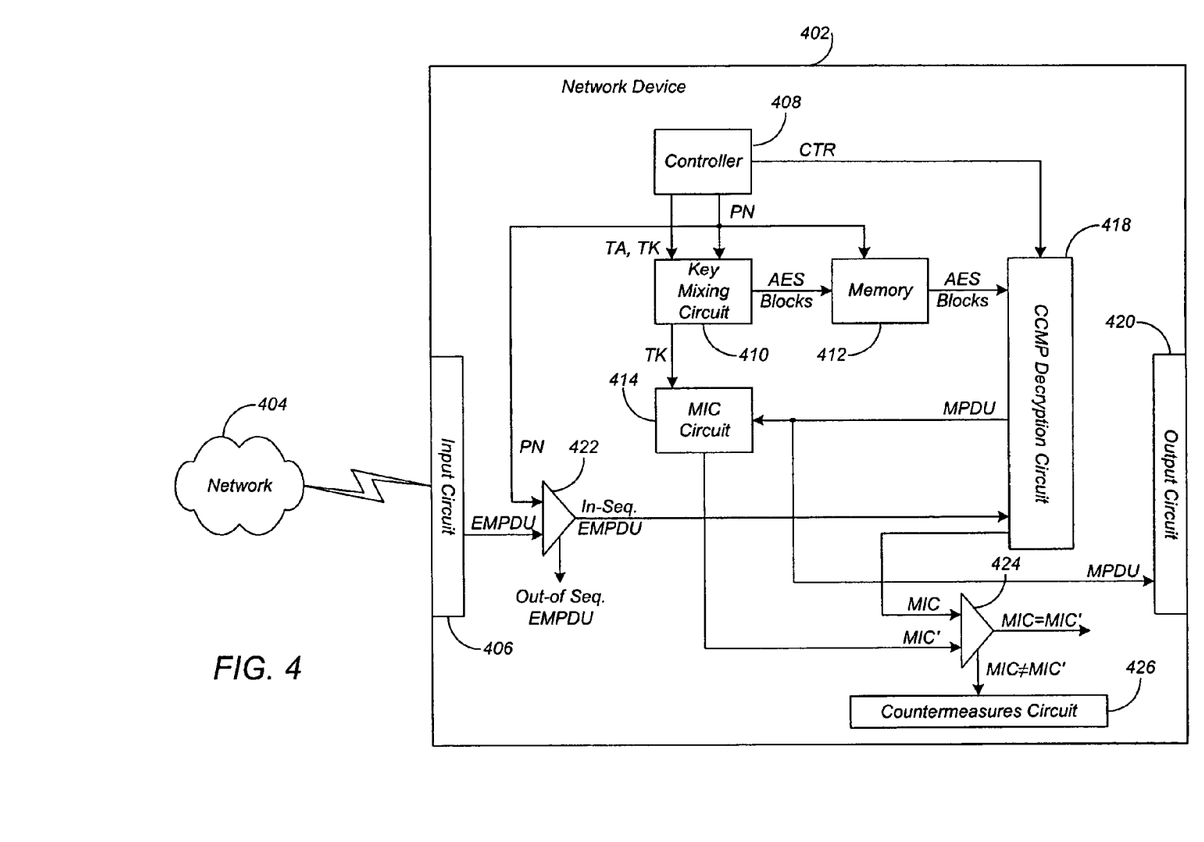
FIG. 4 shows a network device in communication with a network such as a WLAN according to a preferred embodiment.

FIG. 4 shows a network device 402 in communication with a network 404 such as a wireless local-area network (WLAN) according to a preferred embodiment. Network device 402 comprises an input circuit 406, a controller 408, a key mixing circuit 410, a memory 412, a Message Integrity Code (MIC) circuit 414, a CCMP decryption circuit 418, an output circuit 420, optional comparators 422 and 424, and an optional countermeasures circuit 426. According to some embodiments, network device 402 is compliant with IEEE standards 802.11i, and is otherwise compliant with one or more of IEEE standards 802.11, 802.11a, 802.11b, 802.11g, 802.11n, 802.16, and 802.20, the disclosures thereof incorporated herein by reference in their entirety.

Figure 5:
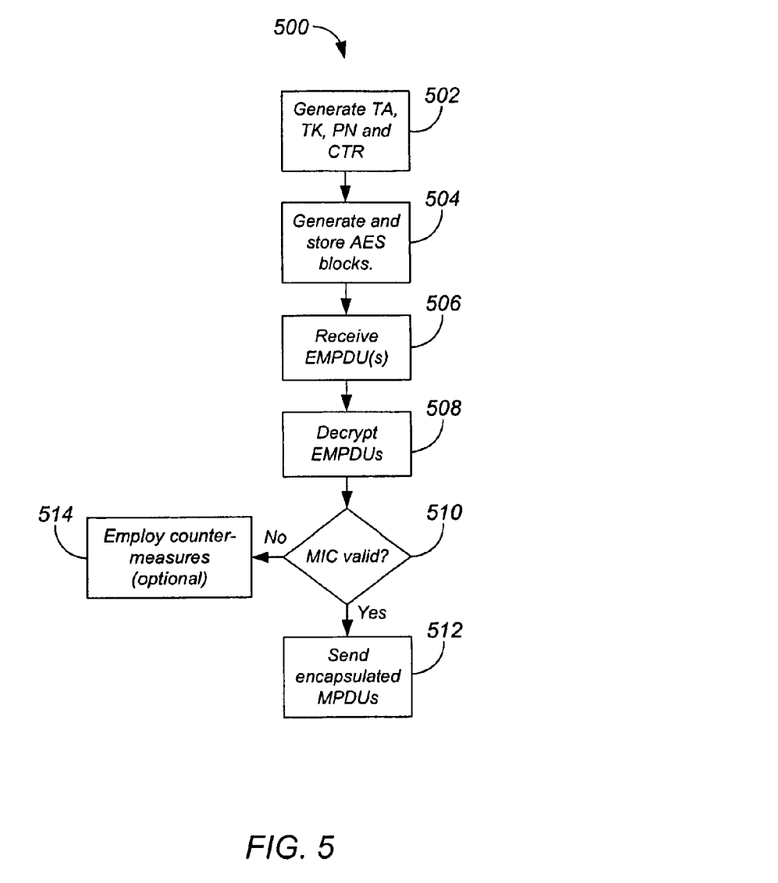
FIG. 5 shows a pipelined two-stage reception and decryption process for network device of FIG. 4 according to a preferred embodiment.

FIG. 5 shows a pipelined two-stage reception and decryption process 500 for network device 402 of FIG. 4 according to a preferred embodiment. In the second of the two stages, each of N encrypted MPDUs (EMPDUs) are decrypted using one of N groups of AES blocks. The first stage of the process generates the N groups of AES blocks ahead of time so they are ready when the second stage begins.

Referring to FIG. 5, controller 408 provides a transmitter MAC address TA, a temporal key TK, and at least a start value for a packet number (PN) and counter (CTR) to key mixing circuit 410 (step 502). The transmitter MAC address TA is a MAC address for the network device transmitting the MPDUs. The temporal key TK is a key that is negotiated in advance by network device 402 and the network device transmitting the MPDUs, as is well-known in the relevant arts. The PN is a counter for the MPDUs to ensure sequential reception at the intended receiver, as described in detail below. The CTR is a counter to count the number of 16-octet blocks in the payload of each MPDU.

In some embodiments, the network device transmitting the MPDUs first transmits a pipelining setup message such as the pipelining setup message described above with reference to FIG. 3 before transmitting the MPDUs. Network device 402 then extracts TA and generates the PN and CTR values for each MPDU based on the pipelining setup message.

In other embodiments, network device 402 generates TA and the values for PN and CTR without the use of a pipelining setup message. For example, network device 402 can generate a set of AES blocks for one or more of the known transmitters in network 404 using PN values that are assumed or tracked by monitoring network traffic and CTR values limited by a maximum expected MPDU size. In some embodiments, each network device maintains a separate PN counter for each of the other network devices. The network devices can set PN=1 on network initialization, association with the corresponding network device, and the like, to ensure that their PN counters remain synchronized. In such embodiments, no pipelining setup message is needed.

Key mixing circuit 410 generates each of the N groups of AES blocks based upon temporal key TK, transmitter MAC address TA, and the start value for PN, and stores the N groups of AES blocks in memory 412 (step 504). Preferably key mixing circuit 410 generates a group of AES blocks for each of N sequential values of PN beginning with the start value provided by controller 408, although other methods could be used. The start value for PN is preferably initialized to one (PN=1) during initialization of network device 402, and is incremented for each group of AES blocks generated.

Input circuit 406 subsequently receives N EMPDUs (step 506). For example, input circuit 406 can comprise a wireless physical-layer device (PHY) and antenna. As another example, input circuit 406 can be a MAC input circuit that receives the EMPDUs from a separate PHY and antenna in communication with network 404.

Optional comparator 322 checks the value of PN in each EMPDU against the expected value. Out-of-sequence EMPDUs are discarded. In-sequence EMPDUs are provided to CCMP decryption circuit 418.

CCMP decryption circuit 418 decrypts each of the N EMPDUs using the one of the N groups of AES blocks that was generated based on the value for the PN in the respective one of the N EMPDUs (step 508). For example, CCMP decryption circuit 418 receives an EMPDU and receives the corresponding group of AES blocks from memory 412, and performs the decryption according to methods well-known in the relevant arts to produce a decrypted MPDU.

MIC circuit 414 computes a MIC value for each MPDU based upon a MIC key (step 510). Optional comparator 324 checks the value of PN in each MPDU against the computed value. If the MIC values are equal, output circuit 420 sends the MPDU (step 512), for example to a host unit or processor within network device 402. Otherwise, optional countermeasures circuit 326 employs one or more countermeasures (step 514) such as those described in IEEE standard 802.11i.

According to process 500, key mixing circuit 410 generates each of the N groups of AES blocks before input circuit 406 receives the respective MPDU. Therefore each group of AES blocks is available when the corresponding MPDU arrives at CCMP decryption circuit 418. This pipelining process ensures that no time is wasted in waiting for a group of AES blocks to be generated after receiving the corresponding MPDU.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a key mixing circuit configured to generate a plurality of encryption seeds, wherein each encryption seed is generated based upon a predetermined key, a transmitter address, and a corresponding value for a packet number;
an input circuit configured to receive a plurality of packets of data;
a packet number circuit configured to insert, into each packet of data received by the input circuit, a different one of the corresponding values for a packet number; and
an encryption circuit configured to encrypt each packet of data using the encryption seed that was generated based on the corresponding value for the packet number inserted into the packet of data,
wherein the key mixing circuit is further configured to generate each of the plurality of encryption seeds prior to the input circuit receiving the plurality of packets of data.

2. The apparatus of claim 1, further comprising:
an output circuit configured to, subsequent to each packet of data having been encrypted by the encryption circuit, send the plurality of packets of data to an intended recipient,
wherein prior to sending the plurality of packets of data to the intended recipient, the output circuit is configured to send, to the intended recipient, a message comprising i) the transmitter address, and ii) the corresponding value for a packet number inserted into at least one of the plurality of packets of data.

3. The apparatus of claim 2, wherein the message comprises pipelining setup message, the pipelining setup message to assist the intended recipient in decrypting the plurality of packets of data in a pipeline approach.

4. The apparatus of claim 1, further comprising an integrity circuit configured to generate an integrity code for each packet of data, and insert the integrity code into the packet of data,
wherein the integrity circuit is configured to insert the integrity code into the packet of data prior to the encryption circuit encrypting the packet of data.

5. A network device comprising the apparatus of claim 1.

6. The network device according to claim 5, wherein the network device is a wireless network device otherwise compliant with at least one standard selected from the group consisting of IEEE standards 802.11, 802.11a, 802.11b, 802.11g, 802.11n, 802.16, 802.11i, and 802.20.

7. A method comprising:
generating a plurality of encryption seeds, wherein each encryption seed is generated based upon a predetermined key, a transmitter address, and a corresponding value for a packet number;
inserting, into each packet of data of a plurality of packets of data, a different one of the corresponding values for a packet number; and
encrypting each packet of data of the plurality of packets of data using the encryption seed that was generated based on the corresponding value for the packet number inserted into the packet of data,
wherein each of the plurality of encryption seeds is generated prior to the plurality of packets of data being encrypted.

8. The method of claim 7, further comprising:
subsequent to each packet of data being encrypted by the encryption circuit, send the plurality of packets of data to an intended recipient,
wherein prior to sending the plurality of packets of data to the intended recipient, sending, to the intended recipient, a message comprising i) the transmitter address, and ii) the corresponding value for a packet number inserted into at least one of the plurality of packets of data.

9. The method of claim 8, wherein the message comprises a pipelining setup message, the pipelining setup message to assist the intended recipient in decrypting the plurality of packets of data in a pipeline approach.

* * * * *